United States Patent [19]
Gilchrist et al.

[11] Patent Number: 5,823,135
[45] Date of Patent: Oct. 20, 1998

[54] SUSPENDED BIRD FEEDER AND METHOD OF FILLING

[76] Inventors: Randy G. Gilchrist; Cheryl Louise Gilchrist, both of 490 Chestnut Ridge Dr., Seneca, S.C. 29672

[21] Appl. No.: 831,325

[22] Filed: Apr. 2, 1997

[51] Int. Cl.[6] .................................................. A01K 61/02
[52] U.S. Cl. ............................................... 119/52.2
[58] Field of Search .................................. 119/52.2, 52.1, 119/52.4, 54, 55, 56.1

[56] References Cited

U.S. PATENT DOCUMENTS

| | | | |
|---|---|---|---|
| 3,244,150 | 4/1966 | Blair | 119/52.2 |
| 4,819,584 | 4/1989 | Rozumek | 119/51.01 |
| 5,063,877 | 11/1991 | Riggi | 119/52.2 |
| 5,183,005 | 2/1993 | Tyler | 119/52.2 |

*Primary Examiner*—John J. Wilson
*Attorney, Agent, or Firm*—Ralph Bailey

[57] ABSTRACT

A bird feeder has a tiltable horizontally positionable base (C) with cavities for receiving feed metered from an upright jar (G) receivable in a receptacle (F) for positioning of the jar. A horizontal pivot (D) is provided and a peg (E) is spaced laterally thereof in order to provide stability for the base. The bird feeder may be suspended from the top (A).

5 Claims, 3 Drawing Sheets

SUSPENDED BIRD FEEDER AND METHOD OF FILLING

BACKGROUND OF THE INVENTION

This invention relates to a bird feeder having a base which is suspended between opposed frame members and tiltable downwardly for carrying an upright container dispensing bird feed which is removable from an open receptacle carried upon the base.

The problem of providing bird feeders which are easily reached and accessible for filling purposes but preferably carried or suspended in elevated position to render them inaccessible to squirrels and other animals has persisted. Among efforts to solve the problem of filling bird feeders there is illustrated in U.S. Pat. No. 4,819,584, a bird feeder supported upon a pole utilizing a hinge assembly permitting pivotal lowering of the pole. A bird house is in turn suspended from a horizontal bar at the top of the pole to permit outward pivotal movement of the bird house upon the bar to facilitate replenishing the bird house with suitable bird feed. It remains relatively difficult to supply feed to the bird house in a manner as to limit accessability by other animals as well as to meter the feed for supplying the birds.

SUMMARY OF THE INVENTION

Accordingly, it is an important object of this invention to provide a bird feeder having an upright container for bird feed such as bird seed and for metering the bird seed for ready access by the birds while only limited access is provided to other animals such as squirrels.

Another important object of the invention is to provide the bird feeder which may be relatively inexpensively produced in quantity but which retains a rustic appearance utilizing a canning jar receptacle and top for storing bird feed prior to installation of the bird house and which may be utilized thereafter for metering the bird seed affording visual access for determining when the supply of feed needs replenishing.

Another important object of the invention is to provide a bird house having a base carrying an upright receptacle in inverted position thereon but which may be tilted downwardly for removal of the receptacle for replenishment of the bird seed and replacement of the container.

Still another important object of the invention is to provide a base for retaining an upright container with opposed cavities into which feed is metered for birds perched upon laterally extending perches so that the silhouette of the bird is more often seen by one engaged in bird watching.

The invention contemplates suspending a base between opposed frame members for downwardly tilting movement on an offset pivot and providing such a stop as a peg spaced laterally for affording a stable base. Laterally extending perches are provided for access to feed distributed in opposed cavities upon the base through passageways for feed beneath the receptacle into the open cavities for access by the birds.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein.

DESCRIPTION OF A PREFERRED EMBODIMENT

The drawings illustrate a bird feeder having a top A for suspending the bird feeder. Opposed depending frame members B are carried by the top. A horizontal base C extends between lower ends of the frame members. A pivot D tiltably supports the base on the lower ends of the frame members. A disengageable stop member E is spaced laterally of the substantially horizontal pivot for maintaining the base in a substantially horizontal position against any force tending to tilt the base. A threaded connector F is carried upon an upper surface of the horizontal base; and a glass container G for bird feed has an open top receivable in inverted position by the connector for dispensing bird feed in open cavities upon the horizontal base. Thus, when the stop member is disengaged, the horizontal base may be tilted to facilitate access to the container for removal and refilling thereof preparatory to return of the open top to engagement with the connector and return of base to horizontal position. Perches H are provided to facilitate access by birds to the feed in the cavities for feeding.

Figure 1:
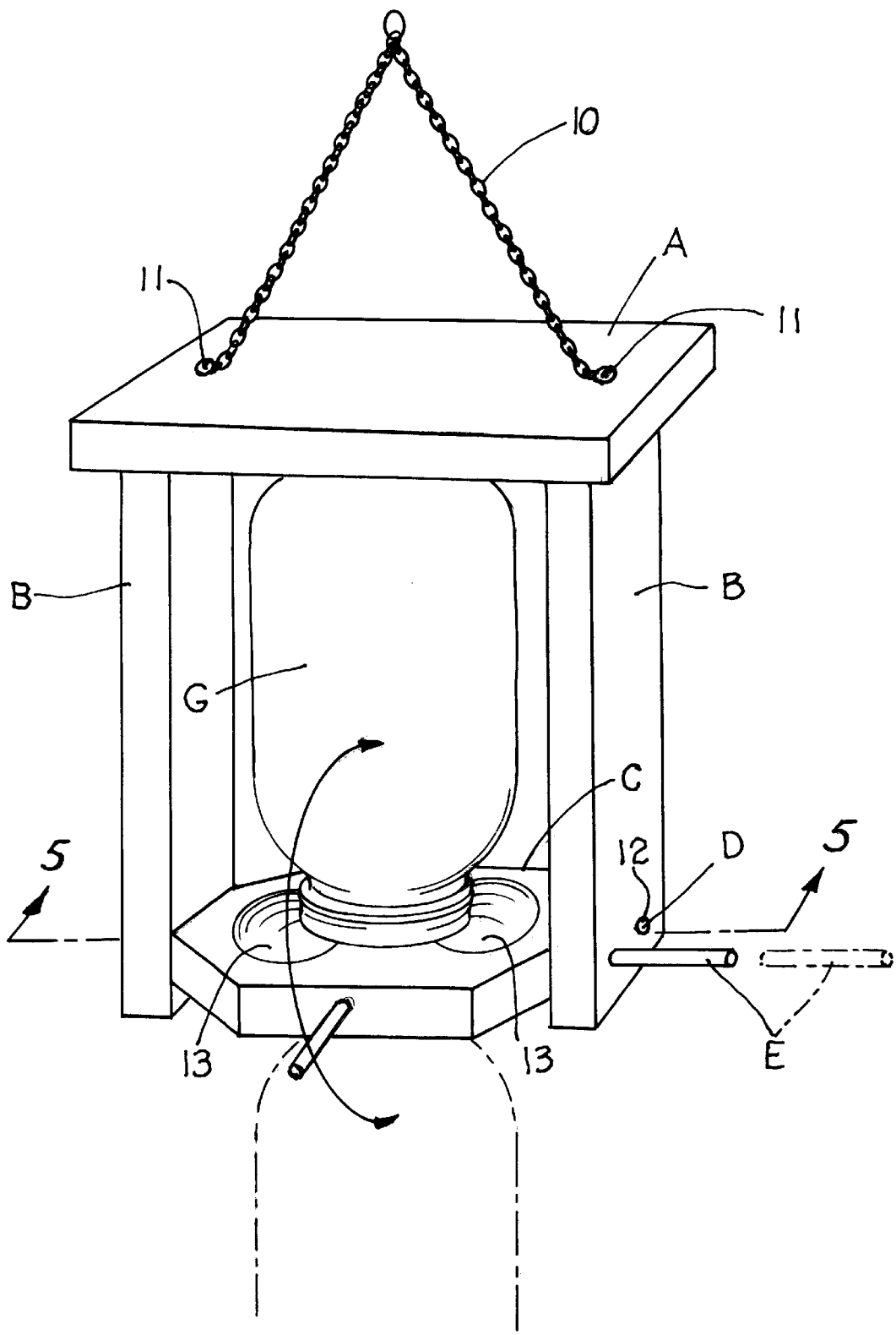
FIG. 1 is a perspective view illustrating a bird house constructed in accordance with the invention suspended from a chain which may in turn be suspended from a limb or other suitable location.
Figure 2:
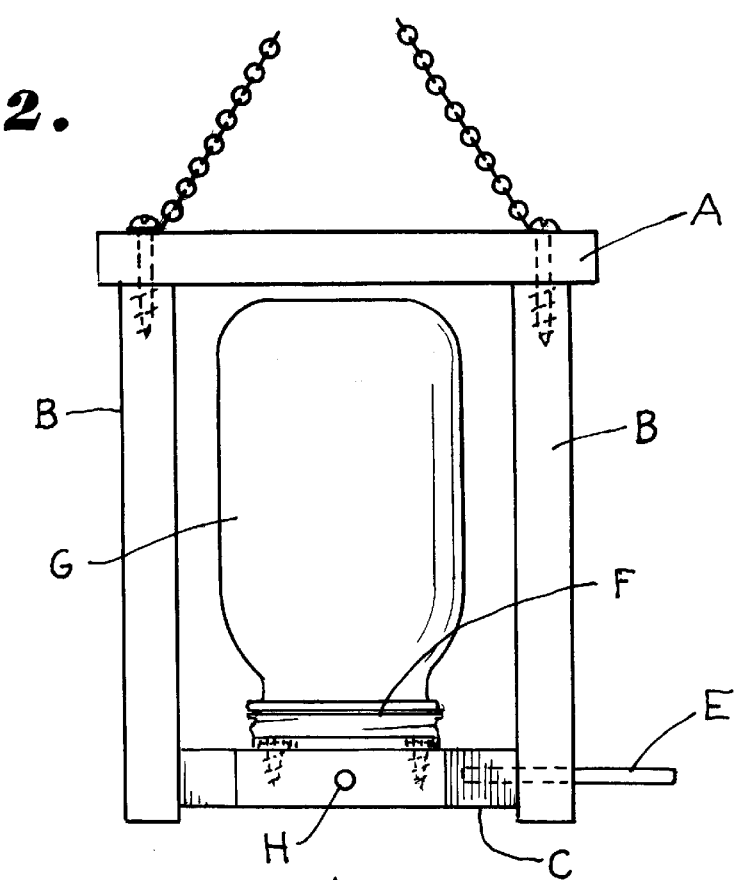
FIG. 2 is a front elevation illustrating the bird house in position between opposed frame members for tilting downwardly and for being maintained by the insertion of a stop in the form of a peg between the frame members and the base.
Figure 3:
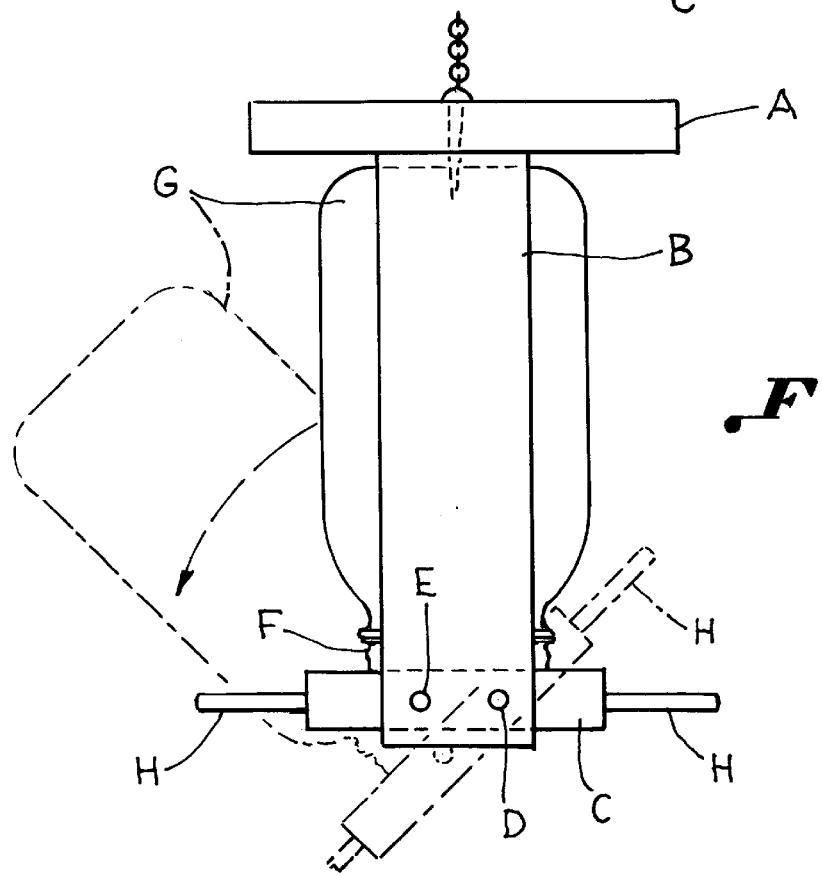
FIG. 3 is a side elevation illustrating the canning jar in initial downwardly tilted position for replenishing the bird seed within the container.
Figure 4:
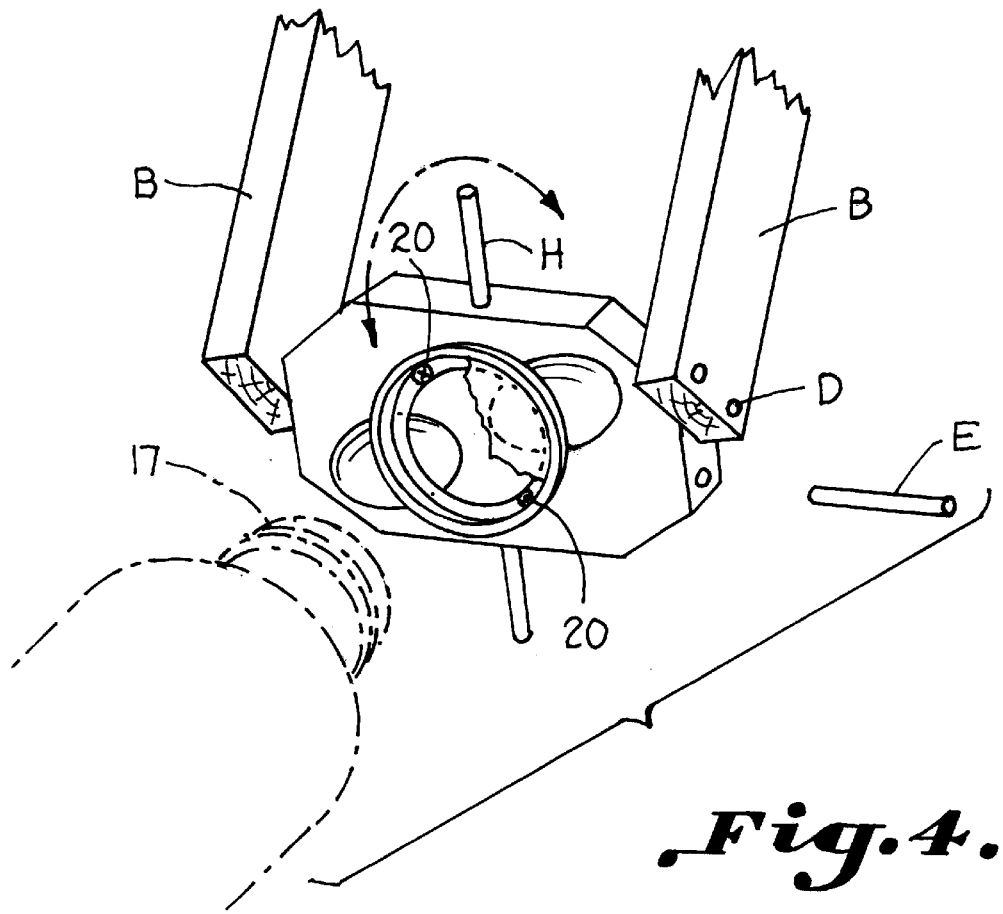
FIG. 4 is a perspective view illustrating the base in partially downwardly tilted position preparatory to replacing a glass canning jar upon a threaded receptacle which is provided to afford communication with the open cavities on the base.
Figure 5:
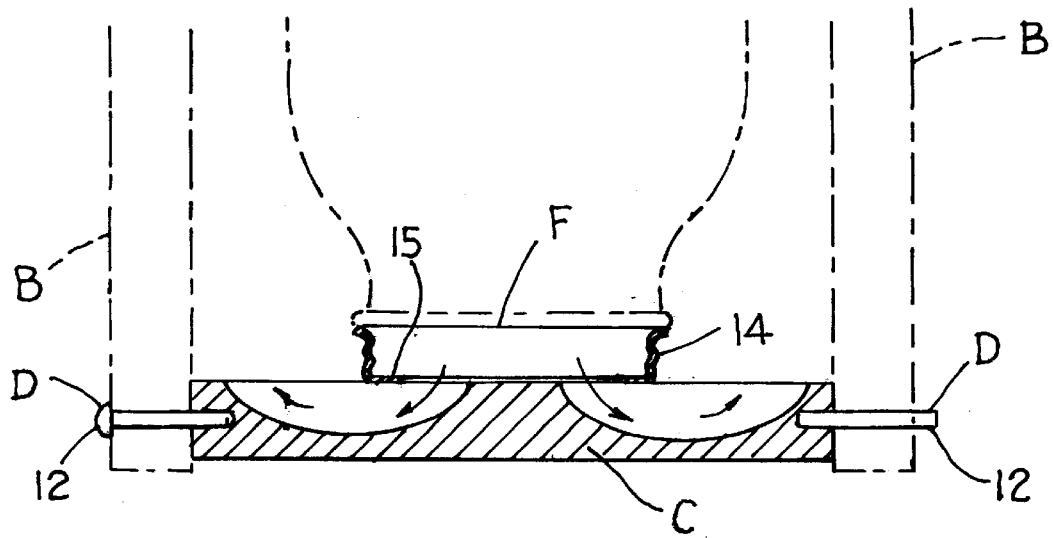
FIG. 5 is an enlarged sectional front elevation taken on the line 5–5 in FIG. 1 illustrating the dispensing of feed through passageways beneath the receptacle from the open topped jar into the cavities for access by the bird.

Referring more particularly to FIGS. 1 and 2, a rectangular top A is preferably constructed of wood to maintain the rustic motif of the bird feeder. The top A serves to suspend the bird house and act as a roof by facilitating the use of a chain 10 attached to the top by screws 11. Suitable vertical rectangular frame members B are suitably fixedly suspended as illustrated in opposed depending relation from the top and carry the base C therebetween for horizontal positioning and for downward pivotal movement about the pivot D which includes pins 12 extending between the depending frame members B and the base C. The base C and the depending frame members are rigidly constructed such as of wood. The base is generally octagonal and has open depressions or cavities 13 for providing open receptacles for feed for the birds. The receptacle communicates with an upright container preferably in the form of a glass jar for metering the feed in a passageway between the receptacle and the cavity. The open receptacle is defined by threaded sides 14. An inwardly projecting flange 15 is illustrated in FIG. 5. The receptacle is open for reception of a threaded reduced open top 17 of the glass jar. FIGS. 1, 3 and 4 illustrates the base tilted downwardly. It is to be understood that the base may be only partially tilted or fully downwardly tilted through 180 degrees.

The pivot D includes the pins 12 extending between respective opposed frame members and adjacent ends of the base C are offset and eccentric so as to facilitate downwardly pivotal movement and permit maximum lateral spacing from a stop member D in order to stabilize the base for horizontal positioning. The peg E is removed as illustrated in FIG. 1 to permit downward pivotal movement of the base.

The top or receptacle is fixed by opposed screws 20 which pass through the flange and into the lower surface of the base (C). If desired, the receptacle (F) may contain a lid liner 21, broken away in FIG. 4, for retaining the feed preparatory to installation of the bird feeder.

It is thus seen that a bird feeder is provided which may be tilted downwardly for facilitating replenshiping the supply of bird feed. Metering of the feed is provided and lateral perches permit access by the birds to the bird feed in the open cavities so as to enhance exposure to the birds for vision viewing feeding.

While a preferred embodiment of the invention has been described using specific terms, such description is for illustrative purposes only, and it is to be understood that changes and variations may be made without departing from the spirit or scope of the following claims.

What is claimed is:

1. A bird feeder comprising:

a top;

means fixedly attached to the top at each end for suspending the bird feeder;

rigid frame members fixedly carried in opposed depending spaced relation by said top;

a base extending substantially horizontally between lower ends of said frame members;

a substantially horizontal pivot tiltably supporting said horizontal base on said lower ends of said frame members;

a stop member removably connecting at least one of said rigid frame members and said base maintaining said base in said horizontal position against any force tending to tilt said base;

a connector carried upon an upper surface of said horizontal base; and a container for bird feed having an open top receivable by said connector when said base is tilted for dispensing bird feed upon said horizontal base;

whereby when said stop member is disengaged, the horizontal base may be tilted to facilitate access to said container for removal and refilling thereof preparatory to reception of said open top by said connector and return of base to horizontal position.

2. The bird feeder set forth in claim 1 wherein said container is a glass jar threadably received in the connector.

3. The method of replenishing a supply of bird feed in a bird feeder comprising the steps of:

positioning a base extending substantially horizontally between spaced opposed rigid frame members;

pivotally supporting said base on said frame members for tilting movement therebetween;

removably engaging a stop member between at least one of the rigid frame members and the base maintaining said base in substantially horizontal position against a force tending to tilt the base;

positioning a connector upon an upper surface of the horizontal base;

providing a container for bird feed having an open top receivable by said connector for dispensing bird feed upon said horizontal base; and tilting said base downwardly removing said container from said connector for replenishing a supply of bird feed;

whereby the base may be tilted to facilitate access to said container for removal and refilling thereof preparatory to reception of said open top by said connector and return of base to horizontal position.

4. The method set forth in claim 3 including the steps of pivoting the base excentrically and providing an offset peg for stabilizing the base in horizontal position.

5. The method set forth in claim 3 including the steps of suspending said frame members;

providing cavities in said base in diagonally opposed relation to the opposed rigid frame members for receiving bird seed from said container; and providing perches on the base in diagonally opposed relation to the cavities for birds facilitating access to the cavities.

* * * * *